C. H. SMITH & C. F. ADAMS.
MOTOR CYCLE LOCK.
APPLICATION FILED JUNE 12, 1912.
1,062,744.
Patented May 27, 1913.
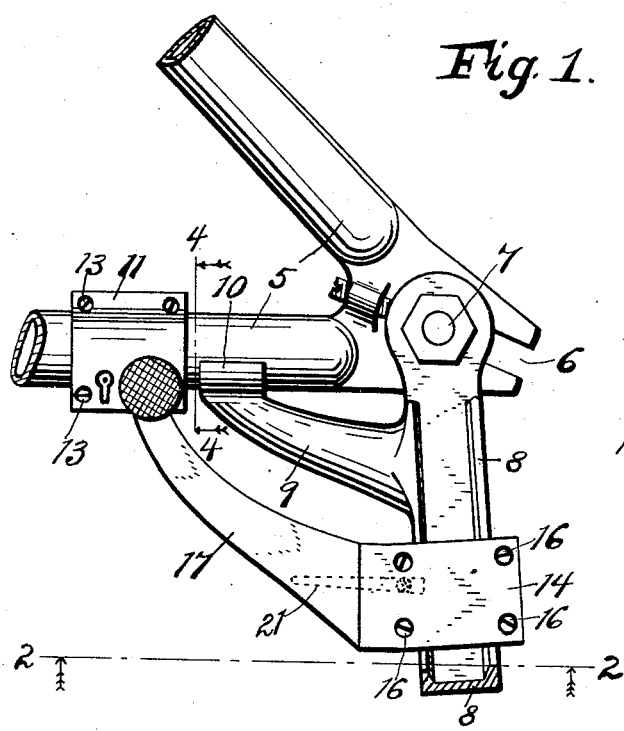
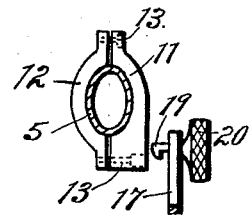
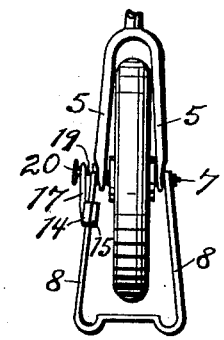
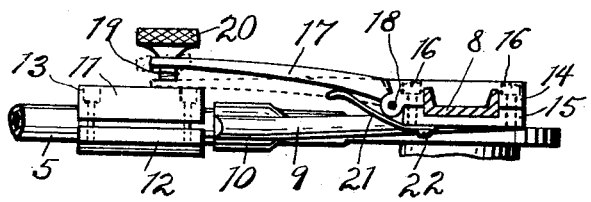
Witnesses:
Thomas Colson.
Nelson Brandt.
Inventors
Charles H. Smith
Charles F. Adams
By Joshua R. H. Pons
Their Attorney.

UNITED STATES PATENT OFFICE.

CHARLES H. SMITH AND CHARLES F. ADAMS, OF CHICAGO, ILLINOIS.

MOTOR-CYCLE LOCK.

1,062,744.          Specification of Letters Patent.          Patented May 27, 1913.

Application filed June 12, 1912. Serial No. 703,176.

*To all whom it may concern:*

Be it known that we, CHARLES H. SMITH and CHARLES F. ADAMS, citizens of the United States, and residents of the city of Chicago, county of Cook, and State of Illinois, have invented certain new and useful Improvements in Motor-Cycle Locks, of which the following is a specification.

Our invention relates to cycle locks and the object of our improvement is to provide a lock and connecting means for locking cycles when so desired, when not in use and resting on their support.

A further object is to provide a device of this kind which will be simple of construction and efficient in operation.

Other objects will appear hereinafter.

The invention consists in the combinations and arrangements of parts hereinafter described and claimed.

The invention will be best understood by reference to the accompanying drawing forming a part of this specification, and in which, Figure 1 is a side elevation of a portion of a cycle frame provided with our locking device, Fig. 2 is a view of the same taken on line 2—2 in Fig. 1; Fig. 3 is a rear elevation of a portion of a cycle supported on its frame and equipped with our device, and Fig. 4 is a sectional view taken on line 4—4 in Fig. 1.

The preferred form of construction as illustrated in the drawing comprises a cycle frame 5, a portion of which is provided with the usual slot 6 for attaching the rear axle and the rear axle 7 secured therein in the usual manner. A support 8 adapted to support the rear portion of the cycle when not in use, is pivoted on the axle 7 and provided with an arm 9 having a supporting surface 10 adapted to engage a portion of the frame 5 to support the rear end of the cycle. The support 8 may be connected to the frame 5 in any desired manner, as this does not form any part of this invention.

The lock of our device is formed in the portion 11 of the clamping member which coöperates with the clamping member 12 to engage the frame 5 and secured together by means of the screws 13 in a manner to rigidly secure the clamp members 11 and 12 to said frame. The clamping members 11 and 12 are formed to conform with the shapes and sizes of different cycle frames without departing from this invention. A second clamp comprising the members 14 and 15 are formed to conform with the size and shape of the supporting frame 8 and secured thereto by means of screws 16 in the manner indicated in the drawing. An arm 17 is secured to the clamping member 14 by means of an elbow joint 18 in a manner to allow the arm to be swung so that the catch 19 will engage the lock in the member 11 to lock the support 8 in the position, indicated in Fig. 1. The engaging shoulders between the member 14 and the arm 17 are preferably formed having their engaging surfaces one at an acute angle with the outside surface of the clamping member 14 and the other with its engaging surface describing an obtuse angle with the outside surface of the clamping member 14. A knob 20 is secured to the end of the lever 17 to facilitate manual swinging of such lever. Such knob is preferably knurled so as to facilitate manual operation thereof. A spring 21 is secured to the clamping member 15 at one end and having its other end contacting the arm 17 to maintain the engaging shoulders at the joint 18 normally together to hold the catch 19 out of engagement with the lock in the member 11 and allow the catch to be manually engaged in such lock when so desired. With this device the catch 19 will be brought opposite the lock in the member 11 upon swinging the support 8 to the position in which it supports the rear end of the cycle, but such catch will not be engaged with the lock until the lever 17 is manually moved so that such catch will engage the lock. The advantage in providing this form of locking device is to permit of the cycle being supported on the support 8 without locking the lock, when so desired, and allowing such lock to be locked when so desired.

When it is so desired the clamp containing the lock may be arranged to engage the support 8 and the clamping member carrying the arm 17 may be secured to the frame, or a member may be integrally formed with either the frame or the support to carry the lock and another corresponding member formed integrally with the frame to carry the other coöperating portion.

While we have illustrated and described the preferred form of construction for carrying our invention into effect, this is capable of variation and modification without departing from the spirit of our invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A device of the kind described comprising a clamp; a lock in said clamp; a second clamp; an arm connected with said second clamp by means of an elbow joint; a catch on said arm adapted to engage said lock; and a spring on said second clamp maintaining said catch normally out of engagement with said lock, substantially as described.

2. The combination with a cycle frame and support pivotally connected to said frame; of a clamp secured to said frame; a lock in said clamp; a second clamp on said support; an arm connected with said second clamp by means of an elbow joint; a catch on said arm adapted to engage said lock; and a spring on said second clamp normally maintaining said catch out of engagement with said lock, substantially as described.

3. The combination with a cycle frame and a support pivotally connected with said frame; of a clamp secured on said frame; a lock in said clamp; a second clamp on said support; an arm connected with said second clamp by means of an elbow joint and the engaging surfaces of the shoulders of said elbow joint being disposed, one surface at an acute angle and the other at an obtuse angle with the outside of said clamp; a catch on said arm adapted to engage said lock; and a spring on said second clamp normally maintaining said catch out of engagement with said lock, substantially as described.

In testimony whereof we have signed our names to this specification in the presence of two subscribing witnesses.

CHARLES H. SMITH.
CHARLES F. ADAMS.

Witnesses:
JOSHUA R. H. POTTS,
J. SIMONS.

Copies of this patent may be obtained for five cents each, by addressing the "Commissioner of Patents, Washington, D. C."